United States Patent
Abe

(10) Patent No.: US 9,586,537 B2
(45) Date of Patent: Mar. 7, 2017

(54) VEHICLE UNDERCOVER

(71) Applicant: NIHON PLAST CO., LTD., Shizuoka (JP)

(72) Inventor: Ryosuke Abe, Shizuoka (JP)

(73) Assignee: NIHON PLAST CO., LTD., Shizuoka (JP)

( * ) Notice: Subject to any disclaimer, the term of this patent is extended or adjusted under 35 U.S.C. 154(b) by 0 days.

(21) Appl. No.: 14/827,547

(22) Filed: Aug. 17, 2015

(65) Prior Publication Data

US 2016/0052555 A1    Feb. 25, 2016

(30) Foreign Application Priority Data

Aug. 20, 2014  (JP) ................................. 2014-167388

(51) Int. Cl.
  *B60R 13/00*  (2006.01)
  *B60R 13/08*  (2006.01)

(52) U.S. Cl.
  CPC ................................ *B60R 13/0861* (2013.01)

(58) Field of Classification Search
  CPC .................................................. B62D 21/155
  USPC ........ 188/371, 376, 377; 180/69.1; 280/770; 296/187.03–187.13
  See application file for complete search history.

(56) References Cited

U.S. PATENT DOCUMENTS

| | | | | |
|---|---|---|---|---|
| 5,046,777 A | * | 9/1991 | Garnweidner | B60J 5/0444 296/146.6 |
| 6,202,778 B1 | * | 3/2001 | Mistry | B60R 19/00 180/69.1 |
| 6,435,577 B1 | * | 8/2002 | Renault | B60R 19/12 180/69.1 |
| 2012/0205927 A1 | * | 8/2012 | Asakawa | B60R 19/34 293/132 |
| 2013/0181476 A1 | * | 7/2013 | Naoi | B62D 25/10 296/180.1 |

FOREIGN PATENT DOCUMENTS

JP    63-148584 U    9/1988

* cited by examiner

*Primary Examiner* — Dennis H Pedder
(74) *Attorney, Agent, or Firm* — Brundidge & Stanger, P.C.

(57) ABSTRACT

A vehicle undercover is disclosed which avoids giving an excessive impact on an object that collides with a vehicle in a vehicle collision. The vehicle undercover includes: an installation surface to be attached to a bracket; a vertical wall surface that is bent at a front edge of the installation surface and extends downward; and a bottom wall surface that is bent at a lower edge of the vertical wall surface and extends in a front direction of the vehicle. The vehicle undercover further includes easily-deformable portions that are formed in a vehicle width direction at least at a corner portion between the installation surface and the vertical wall surface and at a corner portion between the vertical wall surface and the bottom wall surface, respectively, and that allow the respective corner portions to bend easily.

2 Claims, 6 Drawing Sheets

VEHICLE UNDERCOVER

CROSS REFERENCE TO RELATED APPLICATION

This application is entitled to the benefit of Japanese Patent Application No. 2014-167388 filed on Aug. 20, 2014, and the disclosure of which including the specification, drawings and abstract is incorporated herein by reference in its entirety.

TECHNICAL FIELD

The present invention relates to a vehicle undercover.

BACKGROUND ART

There has been known a technique to cover a bottom part of a front portion of a vehicle body using an undercover for the purpose of preventing entry of trash or a rock, for example, into an engine room while a vehicle travels (e.g., see Patent Literature (hereinafter, referred to as "PTL") 1). The undercover disclosed in PTL 1 includes a stress absorbing portion formed to have a wave-shaped cross-section in order to absorb a collision load in a vehicle collision.

CITATION LIST

Patent Literature

PTL 1
Japanese Utility Model (Registration) Application Laid-open No. SHO 63-148584

SUMMARY OF INVENTION

Technical Problem

The stress absorbing portion is formed in a flat surface of the undercover, however. For this reason, when a compression load in a front and rear direction is applied to the undercover in a vehicle collision, the undercover may bend upward in a dogleg shape in a cross-section at the stress absorbing portion serving as the boundary. In this case, when a component is installed at a position near an upper side portion of the undercover, the undercover hits the component and is thus hindered from bending, thus giving an excessive impact on an object that collides with a vehicle in the vehicle collision.

In this respect, the present invention has been made to solve the abovementioned problem and aims to provide a vehicle undercover that avoids giving an excessive impact on an object that collides with a vehicle in a vehicle collision.

Solution to Problem

In order to solve the abovementioned problem, the vehicle undercover according to the present invention, configured to cover a bottom part of a front portion of a vehicle body of an automobile and including a front end portion to be fixed to a fixing portion of the front portion of the vehicle body, comprises: an installation surface to be attached to a vehicle body member; a vertical wall surface that is bent at a front edge of the installation surface and extends upward or downward; a bottom wall surface that is bent at an upper edge or lower edge of the vertical wall surface and extends in a front direction of the vehicle body; and easily-deformable portions at least at a corner portion between the installation surface and the vertical wall surface and at a corner portion between the vertical wall surface and the bottom wall surface, respectively, each easily-deformable portion being formed in a vehicle width direction to allow the corner portion to bend easily.

Advantageous Effects of Invention

According to the present invention, when an object collides with a front portion of a vehicle body, a load applied to the front portion of the vehicle body is transmitted to the undercover, and the load that causes compression in the front and rear direction is applied to the undercover. When such a load is applied to the undercover, the undercover easily bends at the easily deformable portions, thus not hindering the front portion of the vehicle body from moving rearward. Accordingly, it is made possible to avoid giving an excessive reactive force (load) to the object.

DESCRIPTION OF EMBODIMENTS

Figure 1:
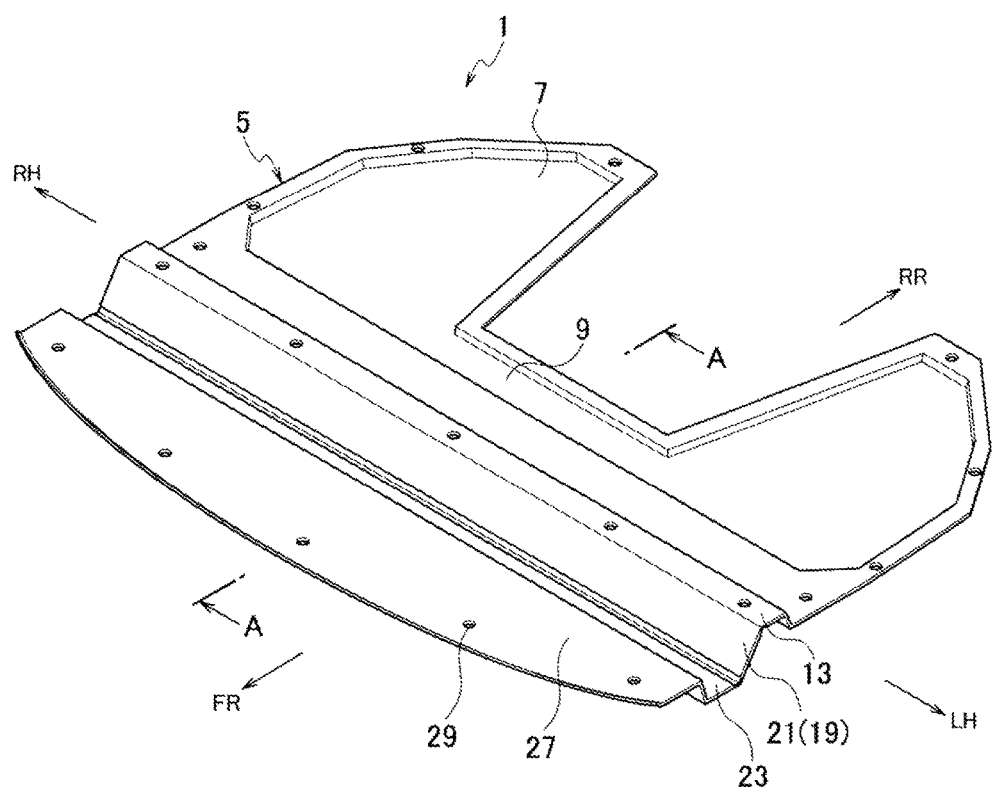
FIG. 1 is a perspective view of an undercover according to a first embodiment of the present invention.

Hereinafter, a description will be given of embodiments of the present invention in detail with reference to the accompanying drawings. Note that, in the drawings, "FR" refers to a front direction (forward) of a vehicle; "RR" refers to a rear direction (rearward) of the vehicle; "RH" refers to a right side of a vehicle width direction of the vehicle; and "LH" refers to a left side of the vehicle width direction of the vehicle.

First Embodiment

Figure 2:
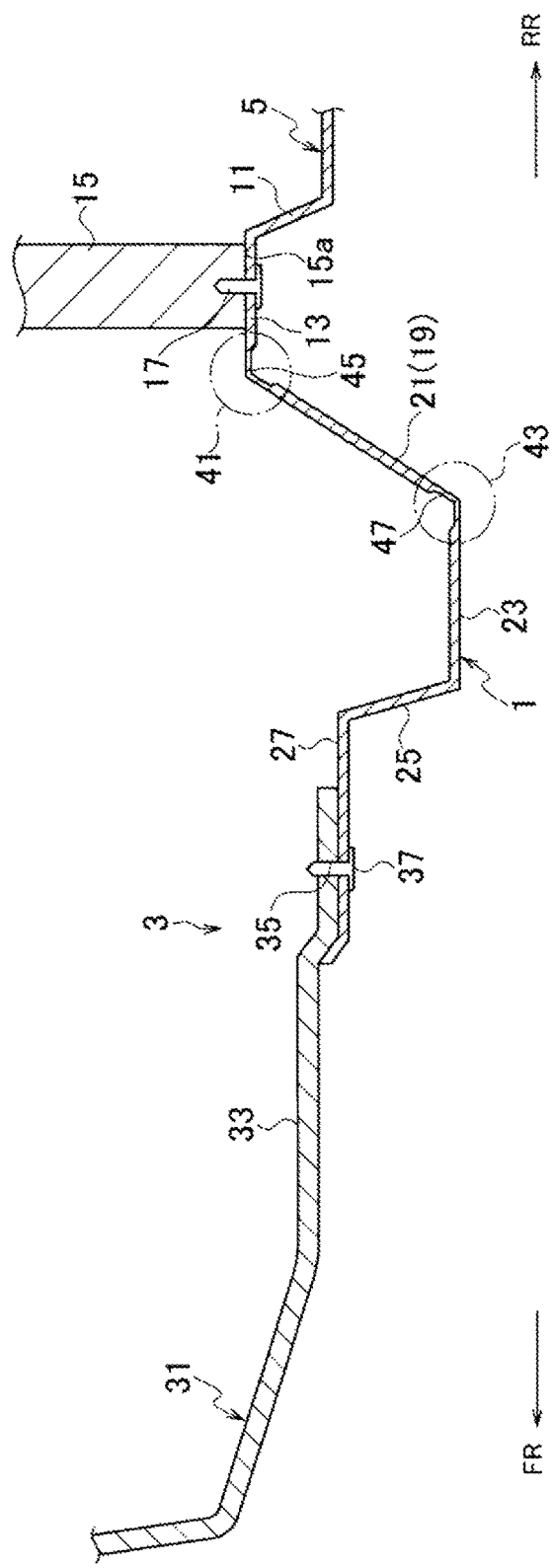
FIG. 2 is a cross-sectional view illustrating a state where the undercover illustrated in FIG. 1 is installed to a vehicle.
Figure 3:
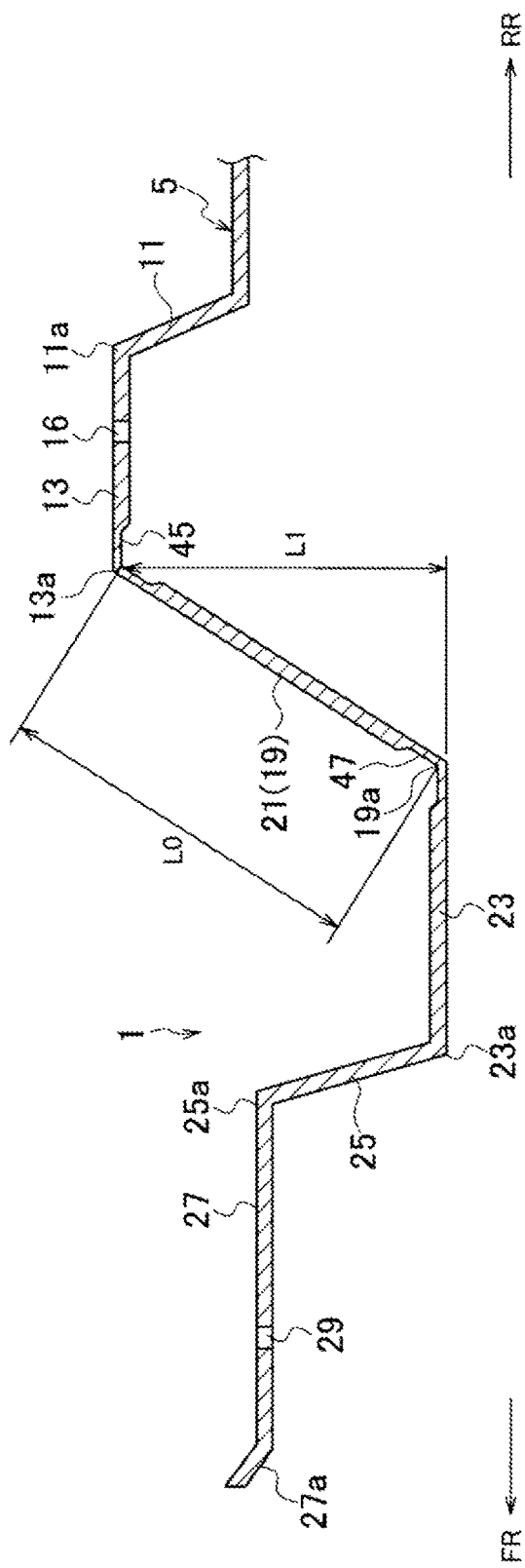
FIG. 3 is a an enlarged cross-sectional view taken along line A-A of FIG. 1.

As illustrated in FIGS. 1 to 3, undercover 1 (vehicle undercover) according to a first embodiment is disposed so as to cover a bottom part of a front portion of a vehicle body (hereinafter, may be referred to as "vehicle body front portion 3") of an automobile.

Rear portion 5 of undercover 1 includes: a pair of extensions 7, which are disposed in the left and right sides of the vehicle width direction, respectively, and extend in the rear direction of the vehicle; and connection portion 9, which connects the pair of extensions 7 together in the vehicle width direction. Rear portion 5 of undercover 1 is thus formed by extensions 7 and connection portion 9 in a U-shape when viewed in a plan view. Note that, vertical wall 11, which extends obliquely upward as it extends in the front direction, is formed at the front edge of rear portion 5.

Installation surface 13, which is bent at front edge 11a of vertical wall 11 and extends in the front direction, is formed forward of rear portion 5. Installation surface 13 is fixed by clips 17, which are inserted into insertion holes 16, respectively, to a bottom side of bracket 15 (vehicle body member), which extends in an up and down direction, while installation surface 13 is in contact with bottom end surface 15a of bracket 15. Vertical wall surface 19, which is bent at front edge 13a of installation surface 13 and extends obliquely downward as it extends in the front direction, is formed forward of installation surface 13. More specifically, vertical wall surface 19 is formed as inclined surface 21, which extends obliquely downward as it extends in the front direction. Moreover, bottom wall surface 23, which is bent at lower edge 19a of vertical wall surface 19 and extends in the front direction, is formed forward of vertical wall surface 19. Vertical surface 25 and bumper attachment surface 27 (front end portion of the undercover) are formed forward of bottom wall surface 23. Vertical surface 25 is bent at front edge 23a of bottom wall surface 23 and extends obliquely upward, and bumper attachment surface 27 is bent at upper edge 25a of vertical wall 25 and extends in the front direction. Insertion holes 29 are formed in a front portion of bumper attachment surface 27. Clips 37 are inserted through attachment holes 35 and insertion holes 29 while attachment holes 35 of lower wall surface 33 of front bumper 31 are aligned with insertion holes 29, thereby assembling undercover 1 and front bumper 31 together. In addition, flange portion 27a, which is bent and extends obliquely upward, is formed at a front edge of bumper attachment surface 27.

Easily-deformable portions 45 and 47, which allow first corner portion 41 and second corner portion 43 to easily bend, are formed along the vehicle width direction at first corner portion 41 between installation surface 13 and vertical wall surface 19, and at second corner portion 43 between vertical wall surface 19 and bottom wall surface 23, respectively. More specifically, first corner portion 41 is made thinner than the other general portion by scraping off a bottom side surface of first corner portion 41. This reduction in thickness allows first corner portion 41 to bend easily. Second corner portion 43 is made thinner than the other general portion by scraping off a top side surface of second corner portion 43.

As illustrated in FIG. 3, vertical wall surface 19 is formed as inclined surface 21, and the length of inclined surface 21 along the up and down direction is L0. Meanwhile, when vertical wall surface 19 is formed as a vertical surface extending in a vertical direction, the length of the vertical surface is L1. Since L0 is longer than L1, setting vertical wall surface 19 to be inclined surface 21 allows the length of vertical wall surface 19 along the up and down direction to be longer.

Figure 4:
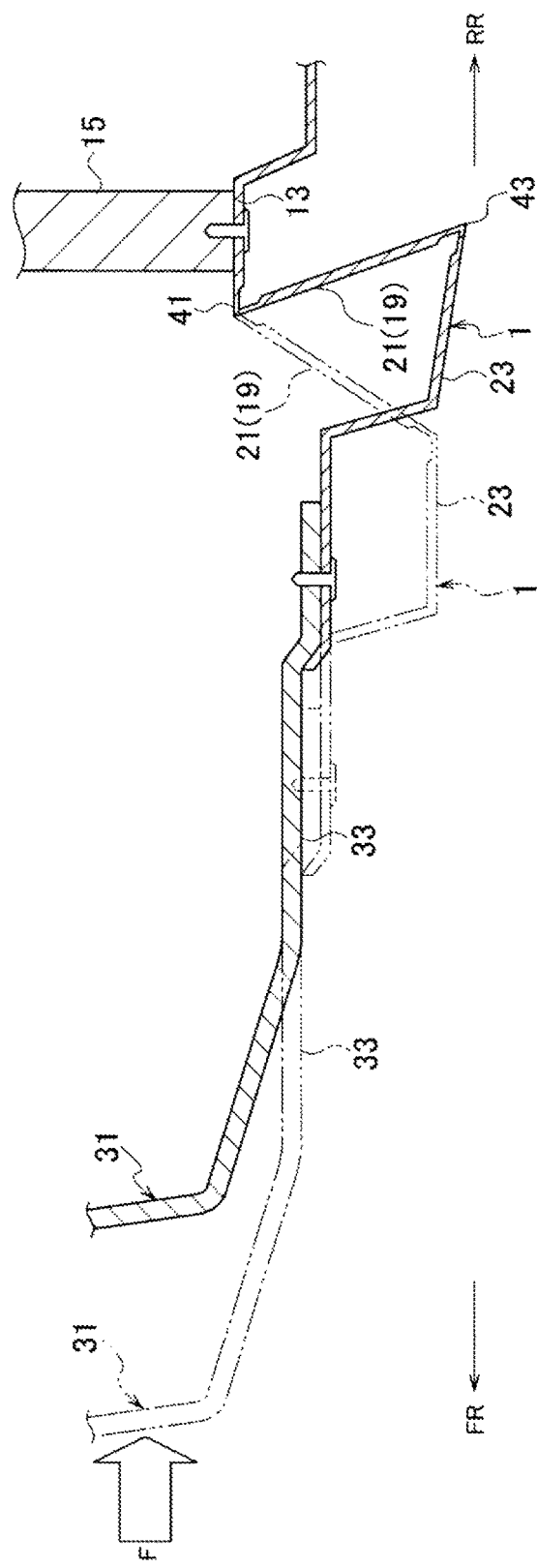
FIG. 4 is a cross-sectional view illustrating a state where the vehicle to which the undercover according to the first embodiment had been installed has caused a front collision, and the dashed-two dotted lines indicate the state before the collision while the solid lines indicate the state after the collision.

Next, a description will be given of a state where undercover 1 deforms because of a vehicle collision, with reference to FIG. 4.

First, front bumper 31 and undercover 1 are placed at positions indicated by the dashed-two dotted lines before a vehicle collision.

When collision load F is applied to front bumper 31 due to the vehicle collision, lower wall surface 33 of front bumper 31 moves rearward as indicated by the solid lines. Since the front end portion of undercover 1 is attached to front bumper 31, undercover 1 also receives the compression load in the front and rear direction.

As described above, easily-deformable portions 45 and 47 are formed at first corner portion 41 between installation surface 13 and vertical wall surface 19 and at second corner portion 43 between vertical wall surface 19 and bottom wall surface 23, respectively. Accordingly, first corner portion 41, and second corner portion 43 easily bend and deform, thereby not hindering rearward movement of front bumper 31.

Figure 5:
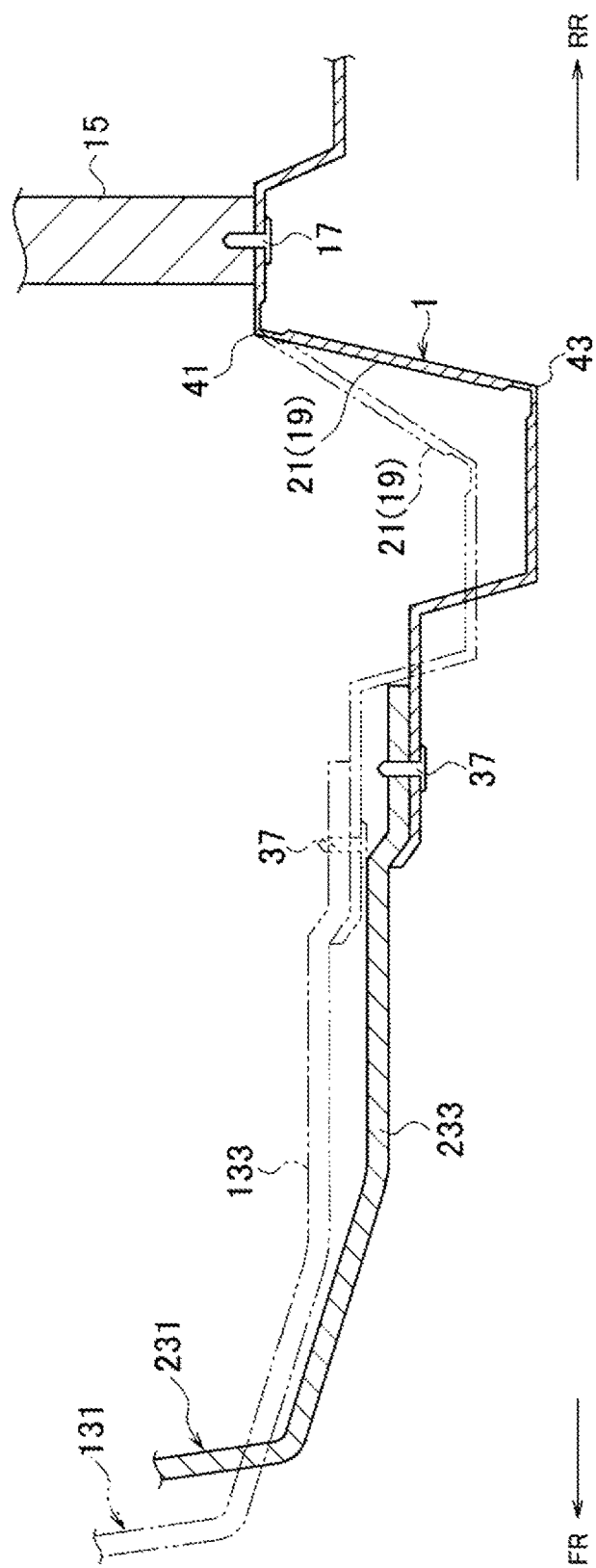
FIG. 5 is a cross-sectional view illustrating a state where the undercover is attached to two kinds of front bumpers having different specifications.

Next, a description will be given of a state where undercover 1 is attached to two kinds of front bumpers having different specifications, with reference to FIG. 5. Hereinafter, front bumper 131 indicated by the dashed-two dotted lines is referred to as "front bumper A" while front bumper 231 indicated by the solid lines is referred to as "front bumper B." Lower wall surface 233 of front bumper B is disposed at a position lower than lower wall surface 133 of front bumper A. In addition, clips 37 used for connection with undercover 1 are disposed more rearward in front bumper B than in front bumper A. More specifically, the front end portion of undercover 1 is disposed more rearward and lower in front bumper B than in front bumper A.

Accordingly, first corner portion 41 and second corner portion 43 bend and deform to a greater extent with front bumper B than with front bumper A. Accordingly, undercover 1 can be attached to both front bumper A and front bumper B which are different in size.

Note that, although bumper attachment surface 27, which is the front end portion of undercover 1, is attached to lower wall surface 33 of front bumper 31 in the first embodiment, bumper attachment surface 27 may be attached to a vehicle component other than the front bumper.

Hereinafter, a description will be given of operational effects of the first embodiment.

(1) Undercover 1 (vehicle undercover) according to the first embodiment covers a bottom part of vehicle body front portion 3 of an automobile and is fixed to lower wall surface 33 (fixing portion for the front portion of the vehicle body) of front bumper 31. Undercover 1 includes: installation surface 13, which is attached to bracket 15 (vehicle body member); vertical wall surface 19, which is bent at front edge 13a of installation surface 13 and extends downward; and bottom wall surface 23, which is bent at lower edge 19a of vertical wall surface 19 and extends in the front direction of the vehicle body. Easily-deformable portions 45 and 47, which allow first and second corner portions 41 and 43 to bend easily, are formed along the vehicle width direction at first corner portion 41 between installation surface 13 and vertical wall surface 19 and at second corner portion 43 between vertical wall surface 19 and bottom wall surface 23, respectively.

Accordingly, in a front collision in which an object collides with a front portion of a vehicle body, a load applied to front bumper 31 is transmitted to undercover 1, and a load that causes compression in the front and rear direction is applied to undercover 1. When such a load is applied to undercover 1, undercover 1 easily bends at easily-deformable portions 45 and 47, thus not hindering rearward movement of front bumper 1. Accordingly, it is made possible to avoid giving an excessive reactive force (load) to the object.

Meanwhile, replacement of the front bumper with one having a different specification causes a change in the position where the bottom wall surface of the front bumper and bumper attachment surface 27 (front end portion) of undercover 1 are fixed to each other in the front and rear position. In this case, undercover 1 can be used for both of the front bumpers having different specifications, thus making it possible to reduce the number of components as well as the costs.

(2) Vertical wall surface 19 is formed as inclined surface 21, which extends obliquely downward as it extends in the front direction of the vehicle body.

When installation surface 13 and bottom wall surface 23 are set while the height positions of installation surface 13 and bottom wall surface 23 are kept the same in the up and down direction, adopting inclined surface 21 rather than a vertical surface extending in the vertical direction as vertical wall surface 19 allows vertical wall surface 19 to be set longer in length in the up and down direction. Accordingly, when the position where lower wall surface 33 of front bumper 31 and the front end portion of undercover 1 are fixed to each other significantly changes in the front and rear direction, undercover 1 having the same configuration can be used as well. In other words, the number of types of front bumper 31 for which undercover 1 is usable (is supported by undercover 1) increases.

Second Embodiment

Figure 6:
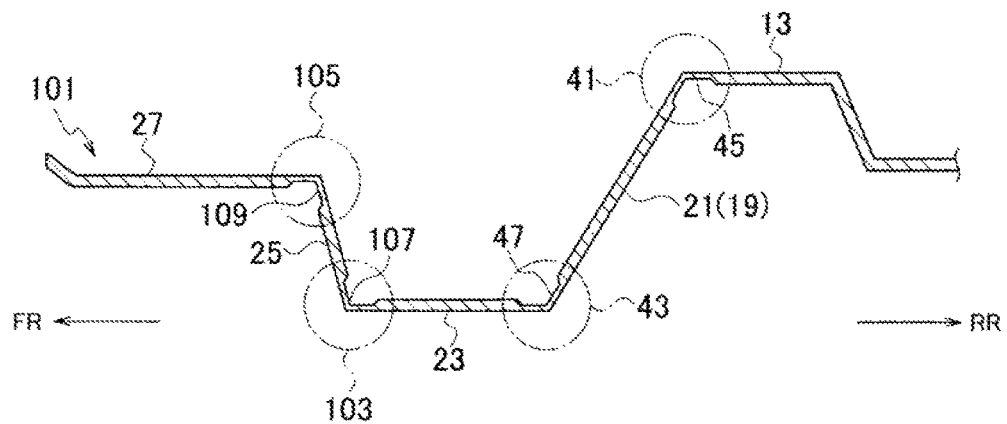
FIG. 6 is a cross-sectional view of an undercover according to a second embodiment of the present invention.

Next, a description will be given of a second embodiment with reference to FIG. 6. In the second embodiment, the components identical to those in the first embodiment are assigned the same reference numerals and the description of the identical components will not be repeated, hereinafter.

Undercover 101 according to the second embodiment includes third corner portion 103, which is formed between bottom wall surface 23 and vertical surface 25, and fourth corner portion 105, which is formed between vertical surface 25 and bumper attachment surface 27.

In the second embodiment, in addition to first corner portion 41 and second corner portion 43, easily-deformable portions 107 and 109, which allow third corner portion 103 and fourth corner portion 105 to bend easily, are formed in the vehicle width direction at third corner portion 103 and fourth corner portion 105, respectively. More specifically, third corner portion 103 is made thinner than the other general portion by scraping off a top side surface of third corner portion 103. Fourth corner portion 105 is made thinner than the other general portion by scraping off a bottom side surface of fourth corner portion 105.

Hereinafter, a description will be given of operational effects of the second embodiment.

(1) In addition to first corner portion 41 and second corner portion 43, easily-deformable portions 107 and 109 are formed in the vehicle width direction at third corner portion 103 and fourth corner portion 105, respectively.

Accordingly, undercover 101 becomes even more bendable and deformable in a front collision in which an object collides with a front portion of a vehicle body. Thus, it is made possible to further avoid giving an excessive reactive force (load) to the object.

Third Embodiment

Figure 7:
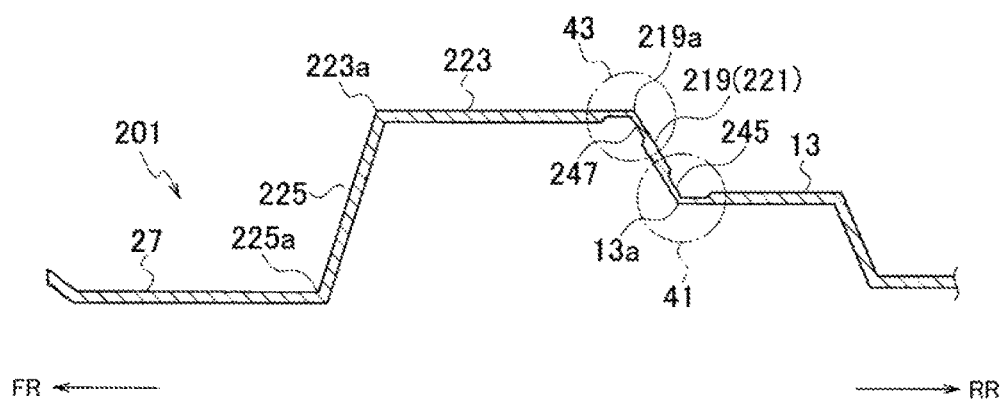
FIG. 7 is a cross-sectional view of an undercover according to a third embodiment of the present invention.

Next, a description will be given of a third embodiment with reference to FIG. 7. Hereinafter, the components identical to those of the first or the second embodiment described above are assigned the same reference numerals, and the description of the components will not be repeated, hereinafter.

Undercover 201 according to the third embodiment is different from the undercover according to the first or the second embodiment in that the bottom wall surface is disposed at a position higher than the installation surface in the up and down direction.

More specifically, vertical wall surface 219 is formed as inclined surface 221, which is bent at front edge 13a of installation surface 13 and extends obliquely upward as it extends in the front direction. Bottom wall surface 223 is bent at front edge 219a of vertical wall surface 219 and extends in the front direction. Vertical surface 225 is bent at front edge 223a of bottom wall surface 223 and extends obliquely downward. Bumper attachment surface 27 is bent at front edge 225a of vertical surface 225 and extends in the front direction.

Moreover, easily-deformable portions 245 and 247, which allow first corner portion 41 and second corner portion 43 to bend easily, are formed in the vehicle width direction at first corner portion 41 between installation surface 13 and vertical wall surface 219 and at second corner portion 43 between vertical wall surface 219 and bottom wall surface 223, respectively. More specifically, first corner portion 41 is made thinner than the other general portion by scraping off a top side surface of first corner portion 41. Second corner portion 43 is made thinner than the other general portion by scraping off a bottom side surface of second corner portion 43.

Hereinafter, a description will be given of operational effects of the third embodiment.

(1) Bottom wall surface 223 is disposed at a position higher than installation surface 13 in the up and down direction. Accordingly, a space is formed under bottom wall surface 223, and this space can be effectively utilized.

Fourth Embodiment

Figure 8:
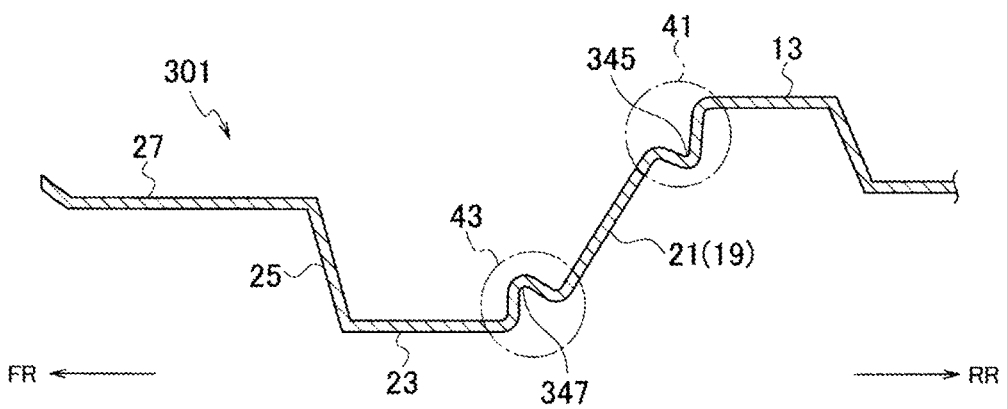
FIG. 8 is a cross-sectional view of an undercover according to a fourth embodiment of the present invention.

Next, a description will be given of a fourth embodiment with reference to FIG. 8. However, the components identical to those in one of the first to the third embodiments described above are assigned the same reference numerals and the description of the components will not be repeated, hereinafter.

The cross-sectional shape of the entire undercover for undercover 301 according to the fourth embodiment is substantially the same as those according to the first and the second embodiments.

In the fourth embodiment, however, although easily-deformable portions 345 and 347 are formed at first and second corner portions 41 and 43, respectively, unlike the first to the third embodiments, easily-deformable portions 345 and 347 are not made thinner than the other general portion and locally curve to form a curved-shape with substantially a constant plate thickness.

Hereinafter, a description will be given of operational effects of the fourth embodiment.

(1) The curve-shaped portions with substantially a constant plate thickness in a curved shape and each including a locally curved portion are adopted as easily-deformable portions 345 and 347.

In the first to the third embodiments described above, the easily-deformable portions are formed by reducing the thickness of the corresponding portions. For this reason, the easily-deformable portions may be damaged, for example, when an impact load is applied to the portions. In the fourth embodiment, however, since easily-deformable portions 345 and 347 have the same thickness as the other general portion, the concern for a possible damage on the easily-deformable portions is reduced.

REFERENCE SIGNS LIST 1, 101, 210, 301 Undercover (Vehicle undercover)
3 Front portion of vehicle body
27 Bumper attachment surface (front end portion)
13 Installation surface
19, 219 Vertical wall surface
21, 221 Inclination surface
23, 223 Bottom wall surface
33 Bottom wall surface (Fixing portion for front portion of vehicle body)
41 First corner portion (corner portion)
43 Second corner portion (corner portion)
45, 47, 107, 109, 245, 247, 345, 347 Easily-deformable portion
103 Third corner portion (corner portion)
105 Fourth corner portion (corner portion)

The invention claimed is:

1. A vehicle undercover configured to cover a bottom part of a front portion of a vehicle body of an automobile and including a front end portion to be fixed to a fixing portion of the front portion of the vehicle body, the vehicle undercover comprising:
   an installation surface to be attached to a vehicle body member;
   a vertical wall surface that is bent at a front edge of the installation surface and extends downward;
   a bottom wall surface that is bent at a lower edge of the vertical wall surface and extends in a front direction of the vehicle body; and
   easily-deformable portions at least at a corner portion between the installation surface and the vertical wall surface and at a corner portion between the vertical wall surface and the bottom wall surface, respectively, each easily-deformable portion being formed in a vehicle width direction to allow the corner portion to bend easily.

2. The vehicle undercover according to claim 1, wherein the vertical wall surface is an inclined surface that extends obliquely downward as the vertical wall surface extends in the front direction of the automobile.

* * * * *